Oct. 14, 1969     D. H. REDMAN     3,472,501

TORCH MACHINE FOR CUTTING CASTELLATED SHAPES

Filed Nov. 13, 1967     4 Sheets-Sheet 1

Inventor

DEREK H. REDMAN

By *Imirie & Smiley*

Attorneys

Oct. 14, 1969     D. H. REDMAN     3,472,501
TORCH MACHINE FOR CUTTING CASTELLATED SHAPES
Filed Nov. 13, 1967     4 Sheets-Sheet 2

Inventor
DEREK H. REDMAN
By *Emrich & Smiley*
Attorneys

Inventor
DEREK H. REDMAN

Inventor
DEREK H. REDMAN

United States Patent Office 3,472,501
Patented Oct. 14, 1969

3,472,501
TORCH MACHINE FOR CUTTING CASTELLATED SHAPES
Derek H. Redman, Croydon, England, assignor to Hancock & Co. (Engineers) Limited, Croydon, Surrey, England, a British company
Filed Nov. 13, 1967, Ser. No. 682,104
Int. Cl. B23k 7/10
U.S. Cl. 266—23                    6 Claims

ABSTRACT OF THE DISCLOSURE

Flame cutting machine for cutting the web of a beam to castellated shape composed of a carriage with back and front pairs of guide wheels engaging one flange of the beam and driven rollers on which the carriage runs along the beam, a driven chain trained around four wheels on vertical shafts set at the corners of a rectangle, and a member fixed to the chain engaging a compound slide so that the slide reciprocates across the carriage with a dwell between consecutive cross movements.

---

This invention relates generally to oxygen jet cutting machines, and more particularly to a type of oxygen jet cutting machine arranged for use as a castellated beam cutter.

It is sometimes required to cut through the web of a beam, for example, an H section beam, so as to provide teeth on each side of the cut. Beams so cut are known as castellated beams and the castellation consists of a series of upstanding teeth which have flanks set at an angle, normally 30°, to the centre line of the teeth. In cutting such beams it is known to use a circular cam cut in a piece of tubing and the cam is followed by a magnetic roller, that is to say, a roller which is magnetized so that it will hold itself against the cam surface and when it is rotated it will run along this surface. However, the magnetic roller drive, as it is termed, is required to oscillate the carriage from side to side across the flange of the beam in order to cut the castellated teeth and also to provide the tractive force necessary to move a carriage carrying the oxygen jet cutter along the length of the beam. This kind of drive has proved to be inadequate especially when cutting large beams since the magnetic roller is prone to slip on the cam.

The principal object of the invention is to provide an oxygen jet cutting machine for cutting castellated beams which provides a much more positive drive, which is readily adapted for cutting beams of different widths and which guides itself along the beam.

The invention consists of an oxygen jet cutting machine comprising a carriage adapted to run along the length of a beam whose web is to be cut to a castellated shape, two pairs of wheels rotatable on vertical axes and spaced apart to engage one flange of the beam, the pairs of wheels being placed at the forward and rear ends of the carriage, a pair of rollers on which the carriage rests and which in turn rest on the edges of the said flanges of the beam upon which the carriage may run in the longitudinal direction of the beam, an endless sinuous member such as a chain trained around four wheels whose axes define a rectangle lying in a plane parallel to the plane of the beam web, means to drive the sinuous member, a slide carrying the oxygen jet cutter movable transversely of the carriage, and driving means carried on the sinuous member engaging the slide so that the slide is reciprocated across the carriage while the carriage is moving in the longitudinal direction.

A preferred embodiment of the invention will now be described with reference to the accompanying drawing in which—

Figure 1:
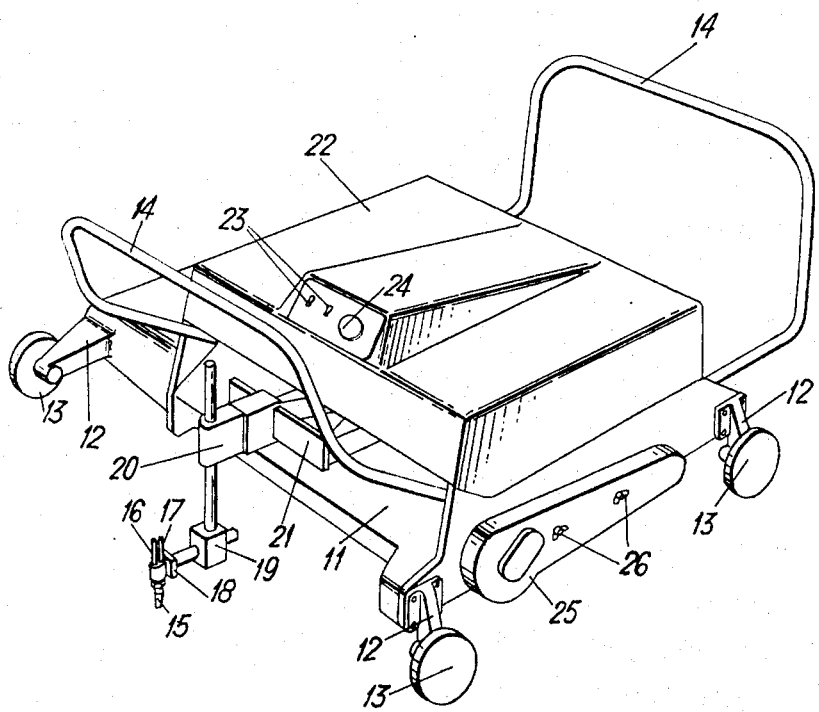
Figure 2:
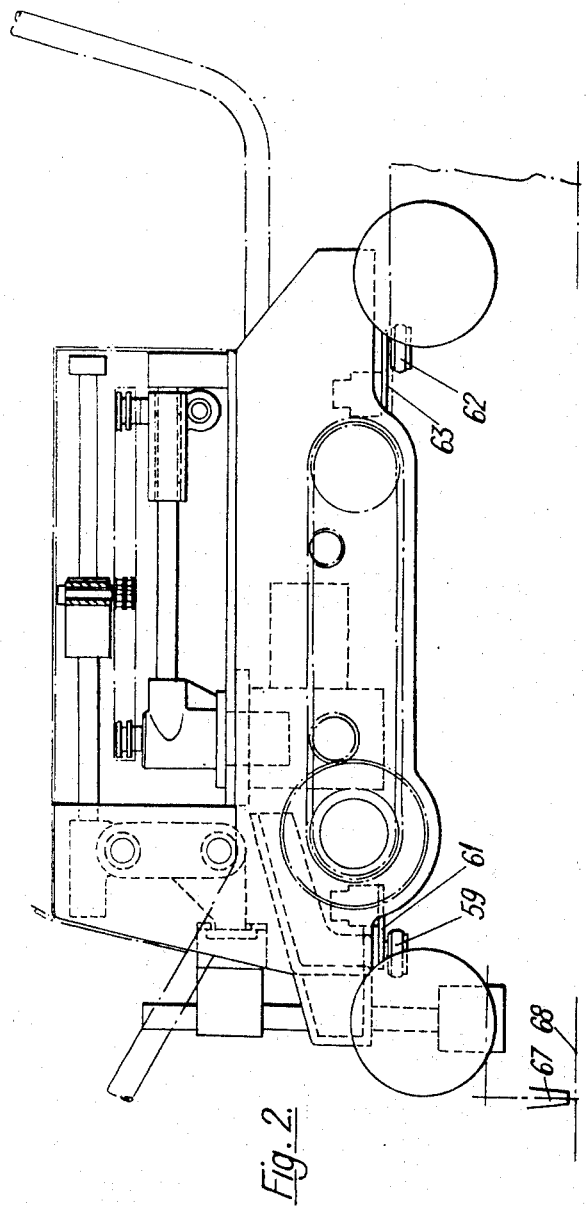
Figure 3:
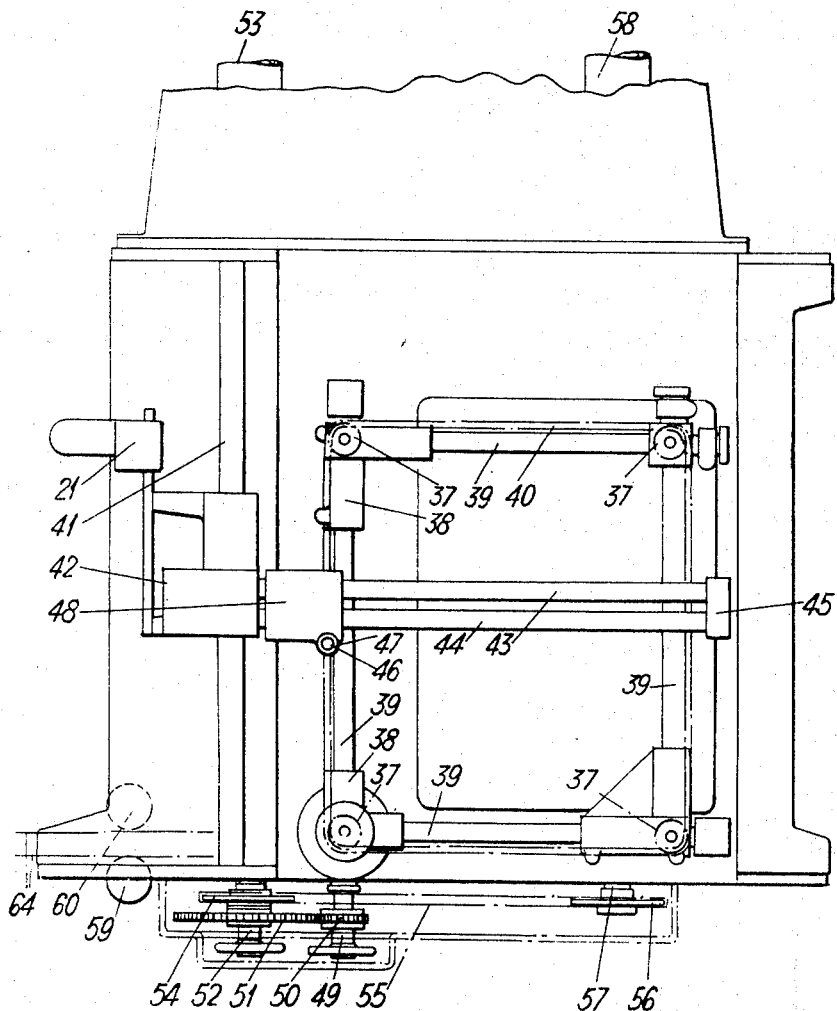
Figure 4:
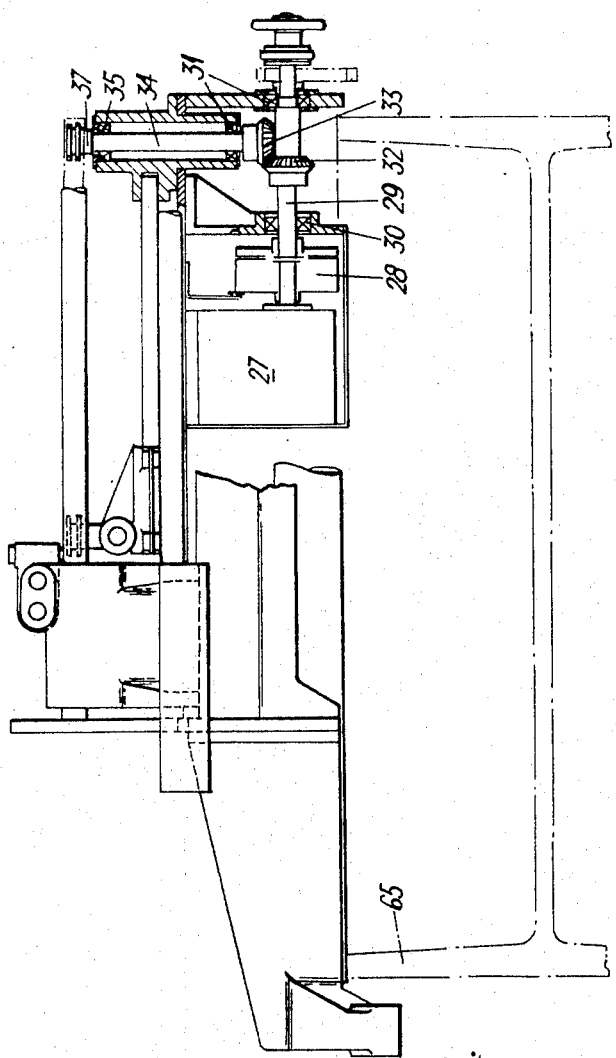

FIGURE 1 is a pictorial view of the machine;
FIGURE 2 is a side elevation of the machine;
FIGURE 3 is a plan view of the machine of FIGURE 1; and
FIGURE 4 is an end elevation looking at the rear of the machine.

Referring first to FIGURE 1, the machine according to the invention comprises a carriage, generally indicated by reference 11, having side brackets 12 mounted upon it, each side bracket carrying a wheel 13. This enables the machine to be wheeled along an ordinary floor and for this purpose a framework including two handles 14 is mounted at the front and rear of the machine. At the front of the machine there is an oxygen jet cutting burner 15 fed by gas pipes, respectively 16 and 17, mounted on a support 18 which, by means of a block 19 and two rods, is supported on a bracket 20 attached to a slide 21. The slide 21 will be more particularly described later and is arranged so that it may reciprocate across a part of the width of the machine. The mechanism of the machine is enclosed by a cover 22 and a control panel is provided carrying control switches 23 and a speed indicating dial 24. At the side of the carriage is a cover 25 secured by two wing nuts 26 enclosing mechanism by which a carriage may be driven along a beam to be cut. This will be described in relation to the other figures.

A geared variable speed motor 27 (FIGURE 4) is provided and this is connected through an electromagnetic clutch 28 to a shaft 29 carried in bearings 30 and 31. Mounted on the shaft 29 is a bevel gear 32 meshing with a similar bevel gear 33 carried on a vertical shaft 34. The vertical shaft 34 is supported in bearings 35 and 36 and carries at its upper end a chain wheel 37. This is one of four such chain wheels, the other three being indicated by the same reference number 37 in FIGURE 3. Each of the shafts carrying a wheel 37 is contained in a housing 38 and rods 39 are provided so that the spacing between the axes of the vertical shafts may be changed, so, however, that the axes of the vertical shafts always define a rectangle. Carried on the chain wheels 37 is a sinuous member such as a chain 40 (indicated by chain dotted lines) and when the one shaft 37 is driven the chain moves around the rectangle defined by the chain wheels at a uniform speed. The slide 21 is arranged so that it may make its transverse movement on a pair of guide rods 41 shown in FIGURE 2, the upper rod being visible in FIGURE 3. The slide 21 includes a block 42 into which two parallel guide rods 43 and 44 are fixed, the remote ends of these rods being secured in an endpiece 45. A pin 46 attached to the chain 37 projects upwardly and engages a bush 47 in a member 48 carried on the rods 43 and 44. Accordingly, as the chain 40 pursues its course around the rectangle defined by the chain wheels 37 the pin 46 will move from one side towards the other side of the carriage to the extent defined by the one side of the rectangle. Thereafter the transverse movement of the slide 21 will cease and the block 48 will move in the longitudinal direction of the carriage until the next corner of the rectangle is reached, after which the slide 21 will be moved back in the transverse direction to its original position. The transverse movement of the slide will again stop while the pin 46 and the block 48 are moving in the longitudinal direction of the carriage.

The drive to the vertical shafts carrying the chain wheels 37 is continued through a shaft 49 (FIGURE 3) which carries a gear 50 meshing with a gear 51 carried on a shaft 52. The shaft 52 has a roller 53 mounted upon it, the roller 53 conveniently consisting of a length of tubing with a smooth (i.e., turned or ground) outer surface. The shaft 52 carries a chain wheel 54 and a chain 55 engaged by the chain wheel 54 also engages a further chain wheel 56 mounted on a shaft 57 which carries a further roller 58. The two rollers 53 and 58 are arranged so that they may lie on the edges of the flanges of an H or channel section girder whose web is to be cut to the castellated shape. A pair of wheels 59 and 60 is carried on a bracket 61 (FIGURE 3) attached to the framework of the carriage and a similar set of wheels, one of which is indicated by reference 62 in FIGURE 2, carried on a similar bracket 63, is provided at the rear end of the carriage. The wheels 59 and 60 and the corresponding wheels at the rear of the carriage are spaced apart by such a distance that they will engage the two faces of one flange which is indicated by the dotted lines 64 in FIGURE 3. In this way the rollers 53 and 58 are driven so that the carriage will run along the beam and the wheels 59 and 60 and the corresponding wheels at the rear of the carriage ensure that the movement is truly in the longitudinal direction of the beam.

An outline of a typical beam is shown by the chain dotted line 65 in FIGURE 4 and the end 67 of the oxygen jet cutter is shown in FIGURE 2 just above the upper surface 68 of the web of the beam in FIGURE 2.

In place of the chain 40 any other suitable sinuous and endless member may be used and the size of the rectangle which its movement defines may be altered by using chains of different lengths and altering the positions of the brackets 38 to suit. In this way the depth of the teeth may be changed and also the spacing between them. During the transverse movement of the slide 21 the carriage is also moved forward by the gearing and the ratio between gears 50 and 51 is so chosen that the requisite angle of 30° (or any other desired angle) is produced. A little consideration will show that when the cutting burner is travelling along the top or bottom of one of the teeth the cutting speed will be that of the carriage as a whole and this is governed by the speed at which the rollers 53 and 58 are driven. When however, the cutting burner is travelling along one of the flanks of the teeth its speed of movement is a combination of the longitudinal movement and transverse movement, and the cutting speed is therefore somewhat higher. Where the angle is 30° this involves an increase in cutting speed of about 15 percent and arrangements may be made, by keeping the longitudinal speed sufficiently low, to ensure that the maximum permitted cutting speed (above which the cut may be "lost") is never exceeded. Alternatively, switches could be placed at the four corners of the rectangle defined by the chain 40 so spaced that they are actuated by the block 48, the switches being so connected in the control circuit of the motor that the motor speed is appropriately raised or lowered as the four sides of the rectangle are traversed by the block 48.

Conveniently the motor contained in the housing 27 is an alternating current type and its speed is controlled by circuitry containing a p-n-p-n gated semiconductor rectifier such as a silicon controlled rectifier. However, any other kind of variable speed motor may be used.

I claim:
1. An oxygen jet cutting machine comprising a carriage adapted to run along the length of a beam whose web is to be cut to a castellated shape, two pairs of wheels rotatable on vertical axes and spaced apart to engage one flange of the beam, the pairs of wheels being placed respectively at the forward and rearward ends of the carriage, a pair of rollers on which the carriage rests and which in turn rest on the edges of the said flanges of the beam upon which the carriage may run in the longitudinal direction of the beam, an endless sinuous member trained around four wheels whose axes define a rectangle lying in a plane parallel to the plane of the beam web, means to drive the sinuous member, a slide carrying the oxygen jet cutter movable transversely of the carriage, and driving means carried on the sinuous member engaging the slide so that the slide is reciprocated across the carriage while the carriage is moving in the longitudinal direction.

2. A machine as claimed in claim 1 comprising side brackets mounted upon the carriage, each side bracket carrying a wheel mounted to rotate on a horizontal axis to enable the machine to be wheeled along an ordinary floor to the beam whose web is to be cut.

3. A machine as claimed in claim 1 comprising four vertical shafts each carrying one of the four wheels, and means by which the spacing between the shafts carrying the four wheels may be altered in such a way that the axes of the vertical shafts always define a rectangle.

4. A machine as claimed in claim 3 comprising a variable speed motor, an electromagnetic clutch, and gearing coupling the variable speed motor to one of the four vertical shafts.

5. A machine as claimed in claim 1 comprising a block carried on the slide, a pair of guide rods carried by the block and lying in the direction of movement of the carriage along the beam, and a member slidable on the guide rods which is engaged by the driving means on the sinuous member, whereby the slide is alternately moved in one direction and the other across the carriage with a pause between each cross movement, to form the castellated shape.

6. A machine as claimed in claim 1 comprising means coupling a motor to the rollers, whereby the carriage may be traversed along the beam being cut.

References Cited

UNITED STATES PATENTS 2,490,119   12/1949   Edinger _____ 266—23

FOREIGN PATENTS 563,256   8/1944   Great Britain.

J. SPENCER OVERHOLSER, Primary Examiner
ROBERT D. BALDWIN, Assistant Examiner

U.S. Cl. X.R.

33—18